(12) United States Patent
Babej et al.

(10) Patent No.: US 8,328,485 B2
(45) Date of Patent: Dec. 11, 2012

(54) FUNCTIONAL ELEMENT, A COMPONENT ASSEMBLY CONSISTING OF A FUNCTIONAL ELEMENT AND A SHEET METAL PART AND ALSO A METHOD FOR THE ATTACHMENT OF THE FUNCTIONAL ELEMENT TO A SHEET METAL PART

(75) Inventors: Jiri Babej, Lich (DE); Michael Vieth, Bad Vilbel (DE); Richard Humpert, Rosbach v.d.H. (DE)

(73) Assignee: Profil Verbindungstechnik GmbH & Co., KG (DE)

( * ) Notice: Subject to any disclaimer, the term of this patent is extended or adjusted under 35 U.S.C. 154(b) by 1294 days.

(21) Appl. No.: 11/619,430

(22) Filed: Jan. 3, 2007

(65) Prior Publication Data
US 2007/0151091 A1    Jul. 5, 2007

(30) Foreign Application Priority Data

Jan. 5, 2006    (DE) .................. 10 2006 000 918

(51) Int. Cl.
*F16B 37/24*    (2006.01)
(52) U.S. Cl. ....................... 411/181; 411/179
(58) Field of Classification Search .......... 411/179–181, 411/184, 187, 188, 107; 29/512
See application file for complete search history.

(56) References Cited

U.S. PATENT DOCUMENTS

| | | | |
|---|---|---|---|
| 3,014,609 A * | 12/1961 | Hobbs | 29/509 |
| 3,204,679 A * | 9/1965 | Walsh | 411/180 |
| 4,610,072 A | 9/1986 | Muller | |
| 5,020,950 A * | 6/1991 | Ladouceur | 411/107 |
| 5,528,812 A * | 6/1996 | Muller | 29/432.2 |
| 5,613,815 A * | 3/1997 | Muller | 411/181 |
| 5,644,830 A * | 7/1997 | Ladouceur et al. | 29/432.2 |
| 6,409,444 B2 * | 6/2002 | Pamer et al. | 411/180 |
| 6,607,339 B1 * | 8/2003 | Mangapora | 411/107 |
| 7,112,024 B2 * | 9/2006 | Ward et al. | 411/180 |
| 2004/0042870 A1 | 3/2004 | Parker et al. | |
| 2005/0163590 A1 | 7/2005 | Ward et al. | |
| 2008/0187408 A1 | 8/2008 | Babej et al. | |
| 2008/0199274 A1 | 8/2008 | Babej | |

FOREIGN PATENT DOCUMENTS

DE    3447006    7/1985
(Continued)

OTHER PUBLICATIONS

English Language Abstract of EP 1 512 877 (part of patent document).

*Primary Examiner* — Gary Estremsky
(74) *Attorney, Agent, or Firm* — Hershkovitz & Associates, LLC

(57) ABSTRACT

A functional element having a functional portion, a generally tubular rivet portion and a ring-like sheet metal contact surface is characterized in that features of shape are provided at the rivet portion for co-movement of the sheet metal part during the formation of the rivet bead, in particular at the free end of the rivet portion and/or at the radially outer side of the rivet portion, at least in the region adjacent the free end of the rivet portion. A component assembly comprising a functional element and a sheet metal part as well as a method for the attachment of a functional element to the sheet metal part are also claimed.

24 Claims, 12 Drawing Sheets

FOREIGN PATENT DOCUMENTS

Figure 2C:
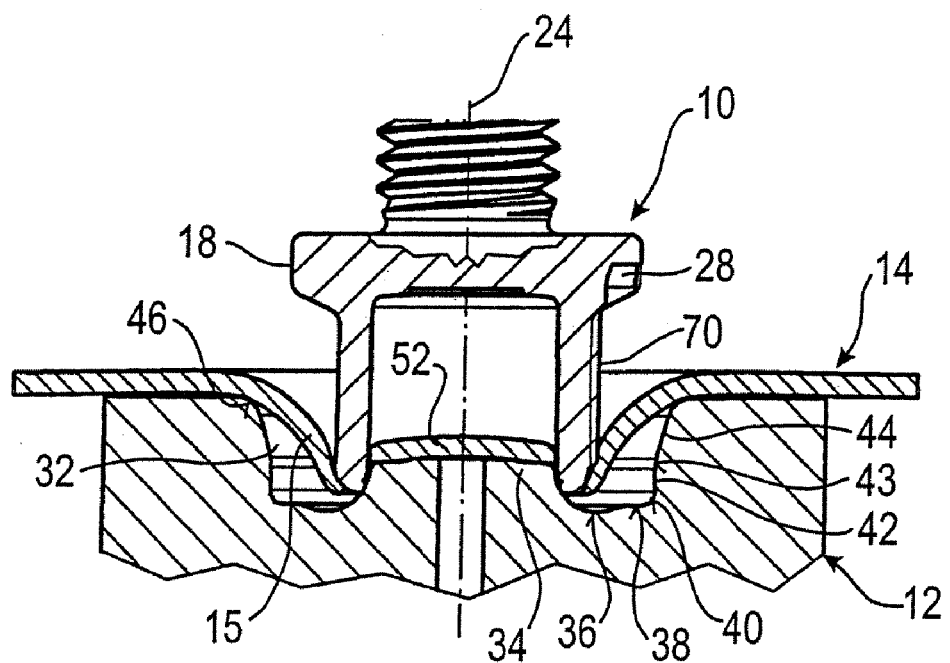

| | | |
|---|---|---|
| DE | 3446978 | 8/1985 |
| DE | 3835566 | 5/1989 |
| DE | 10 2005 024 220 | 11/2006 |
| EP | 1 512 877 | 3/2005 |
| GB | 2 184 510 | 6/1987 |
| WO | WO 2005/050034 | 6/2005 |

* cited by examiner

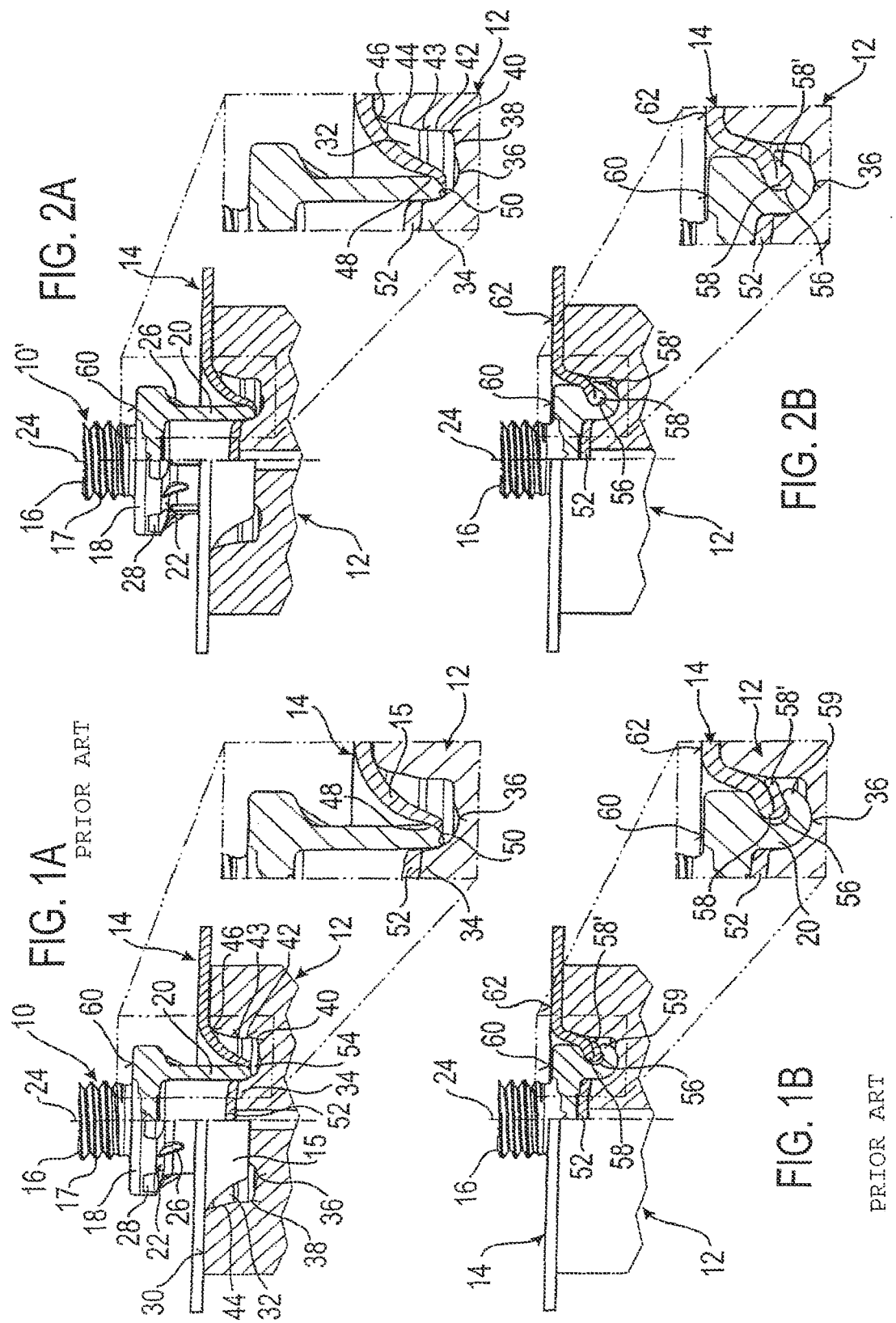

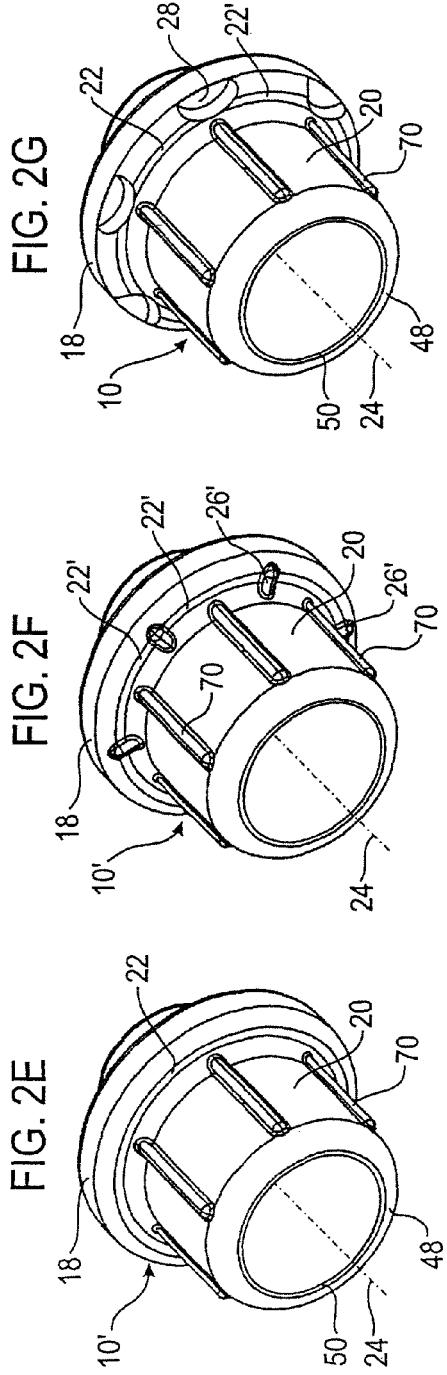

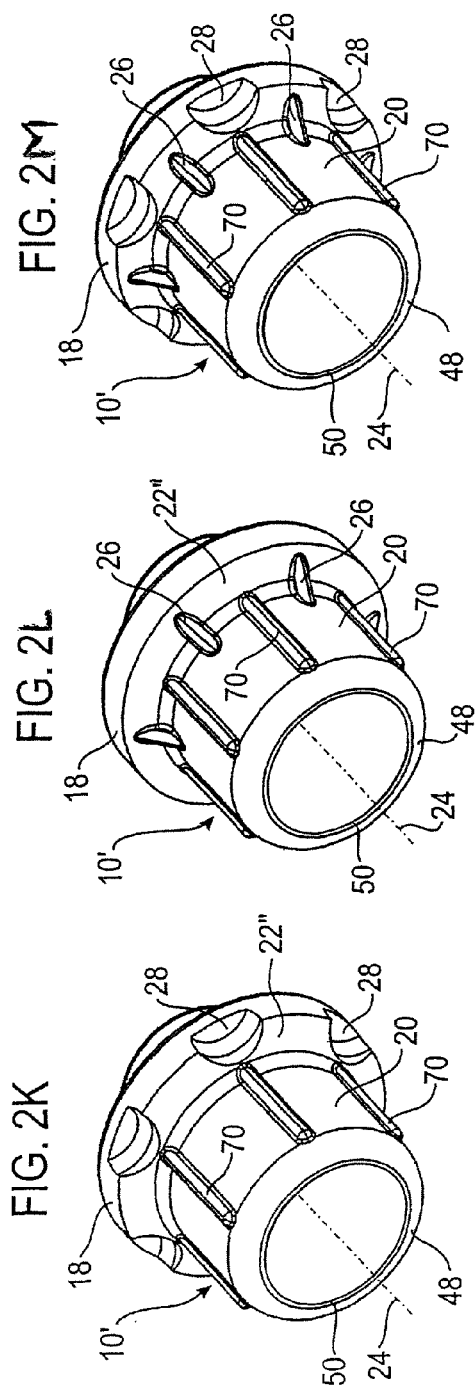
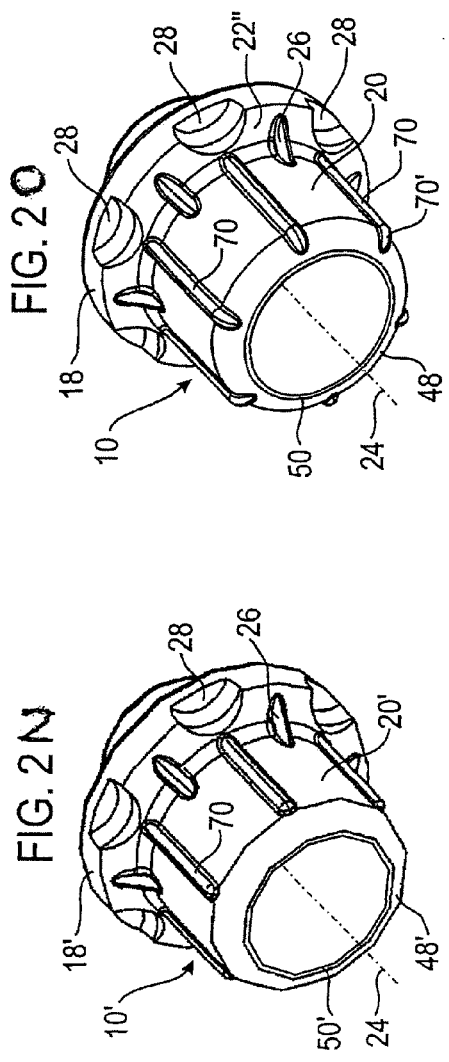

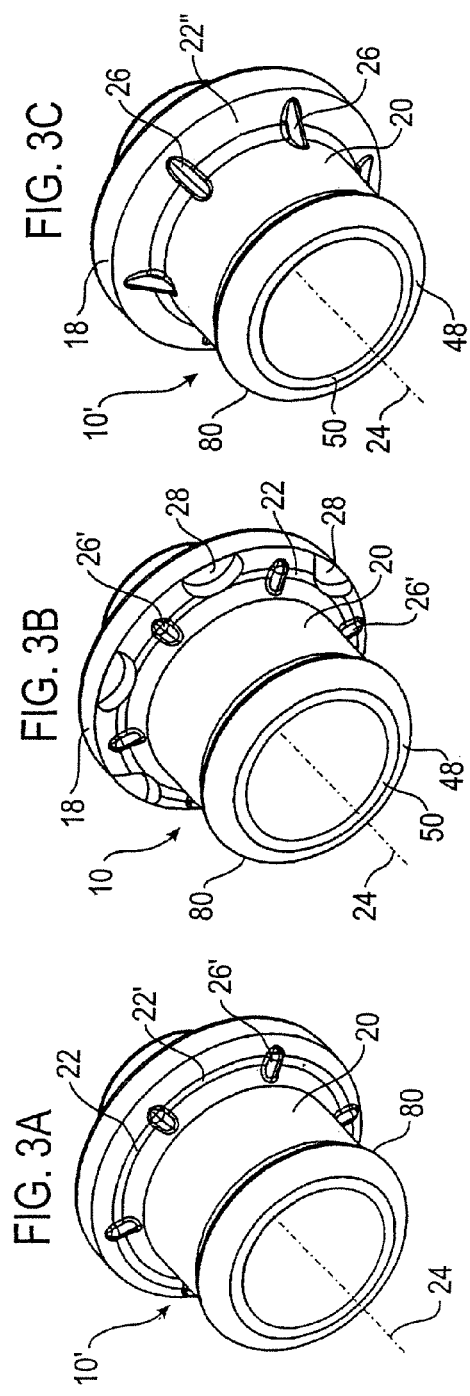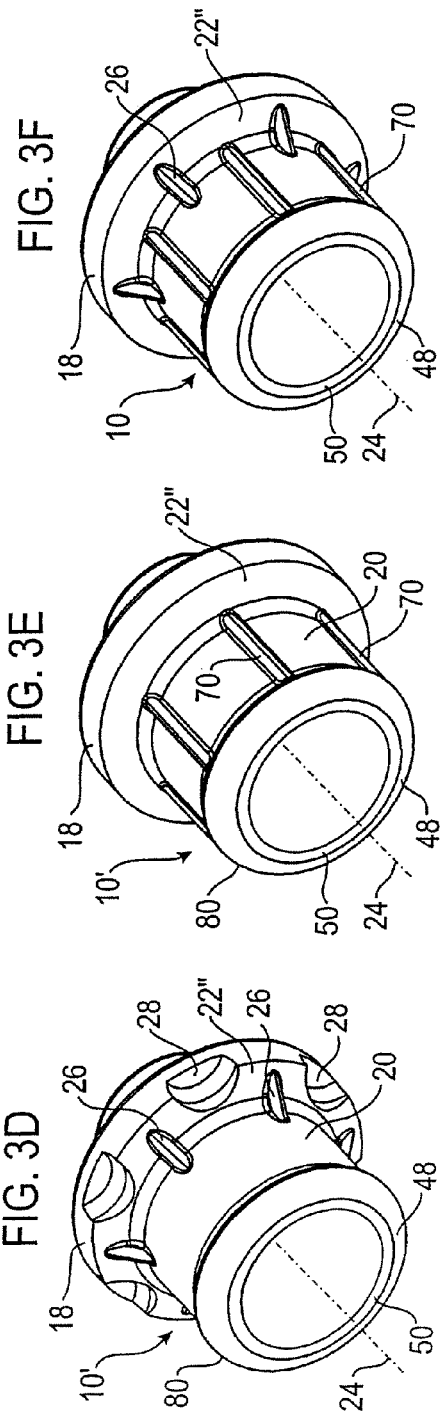

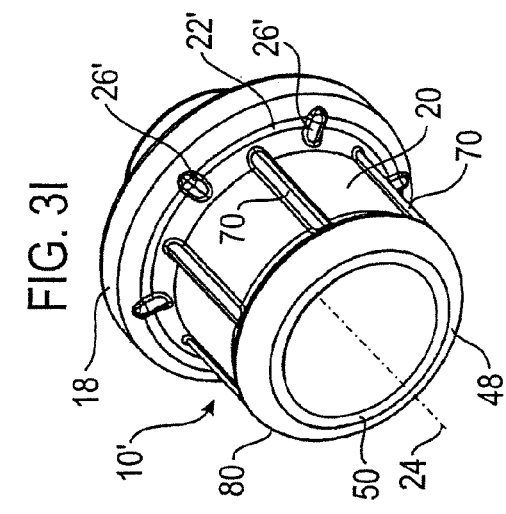
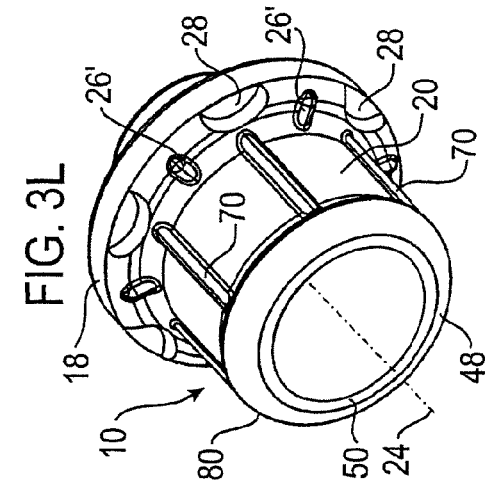
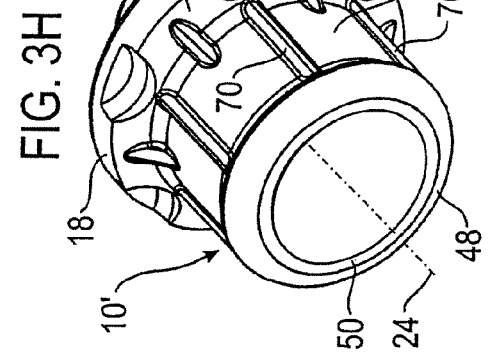
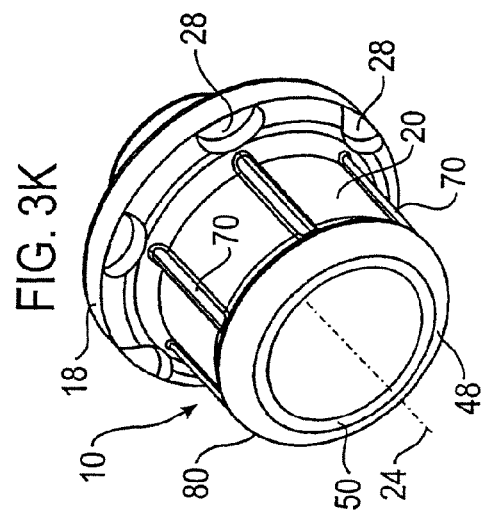
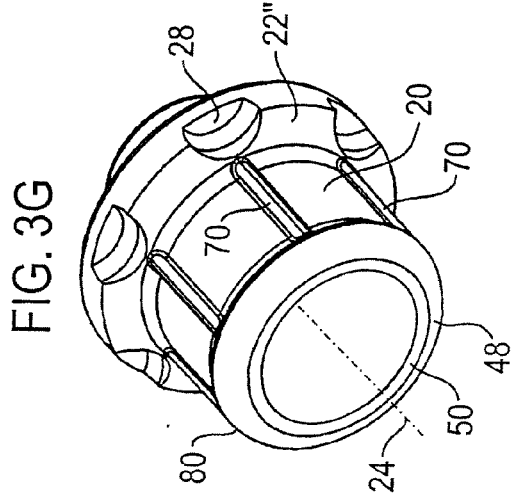
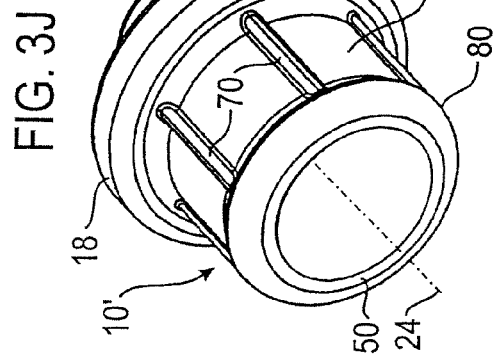

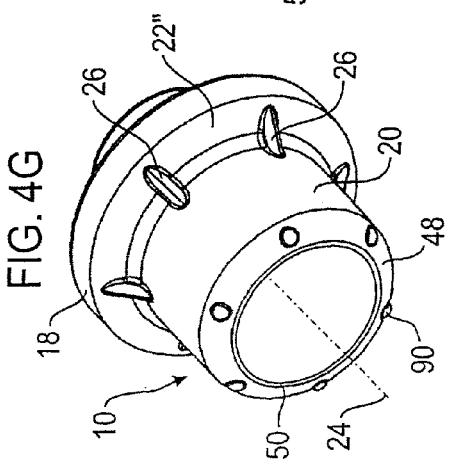
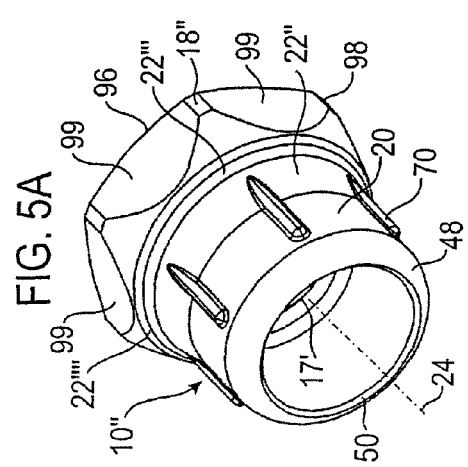
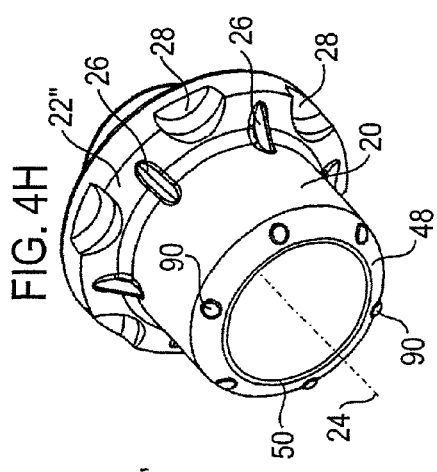
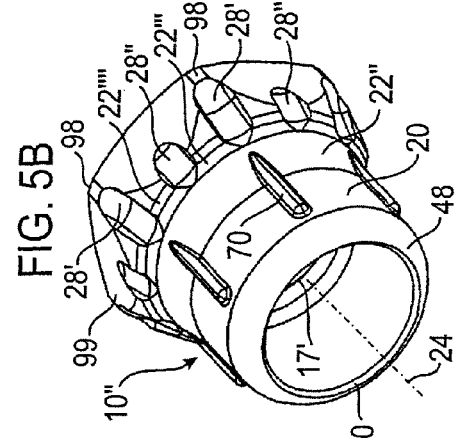
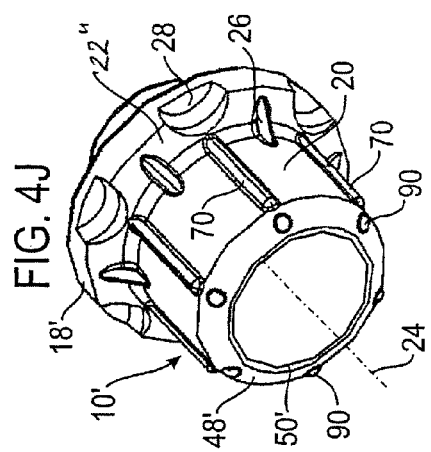
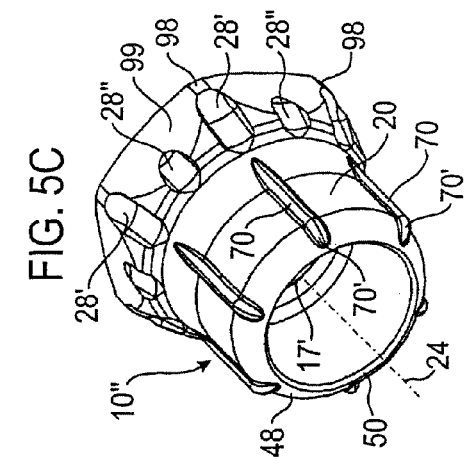

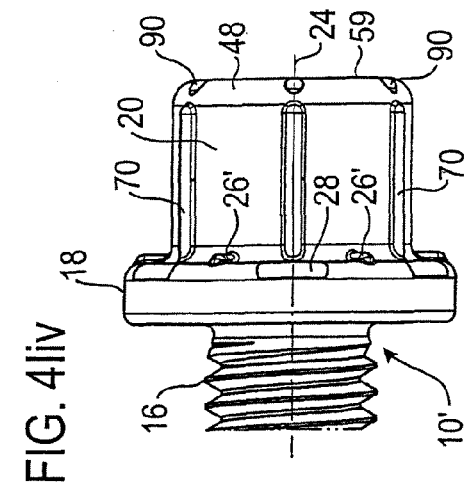
FIG. 4Iiv
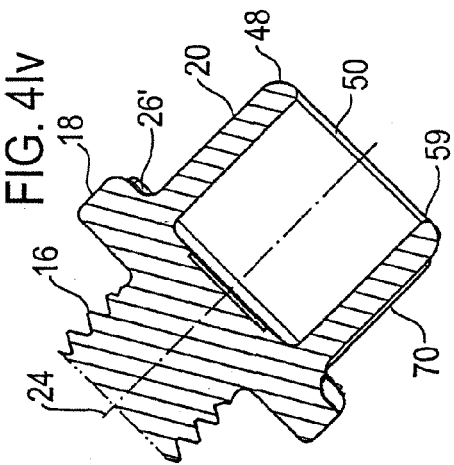
FIG. 4Iv
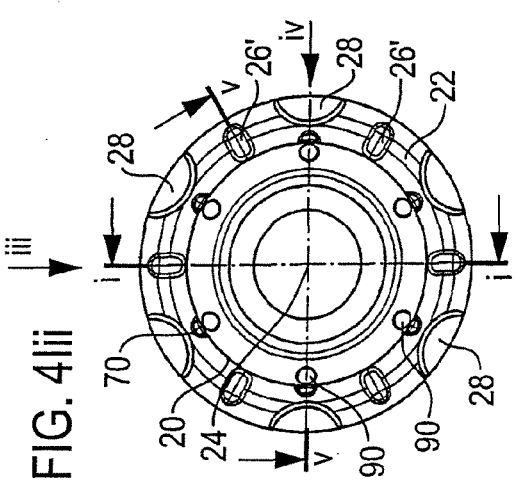
FIG. 4Iiii
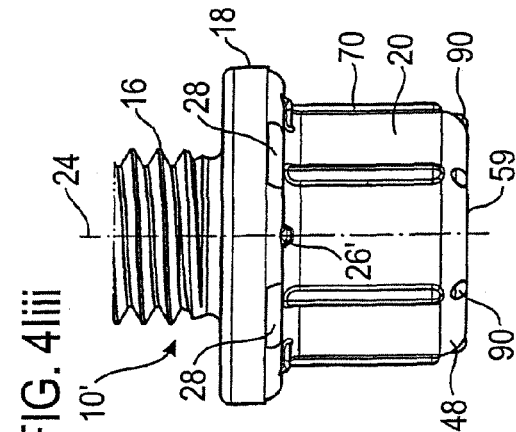
FIG. 4Iiii
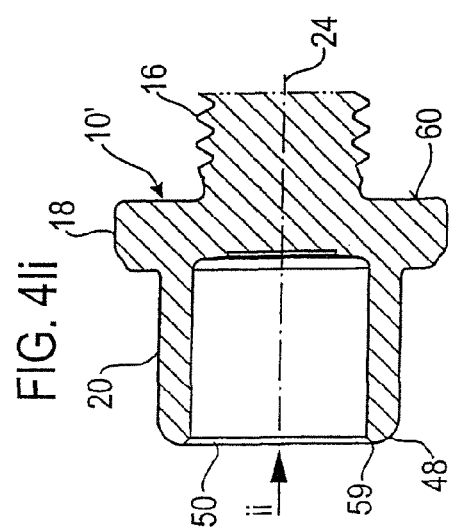
FIG. 4Iii
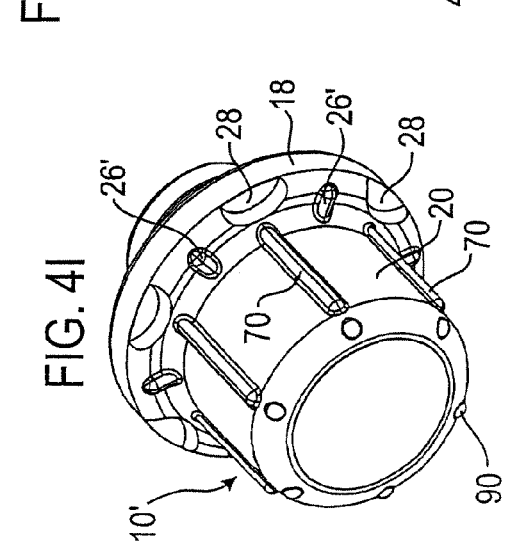
FIG. 4I

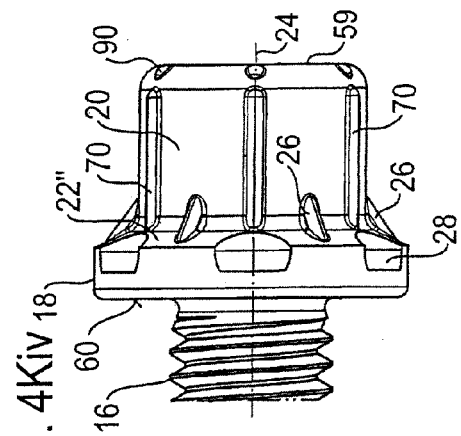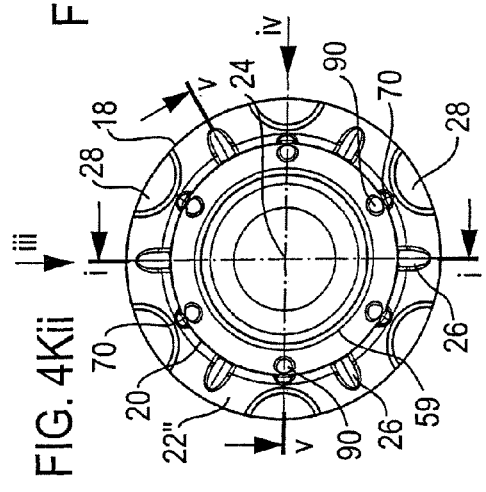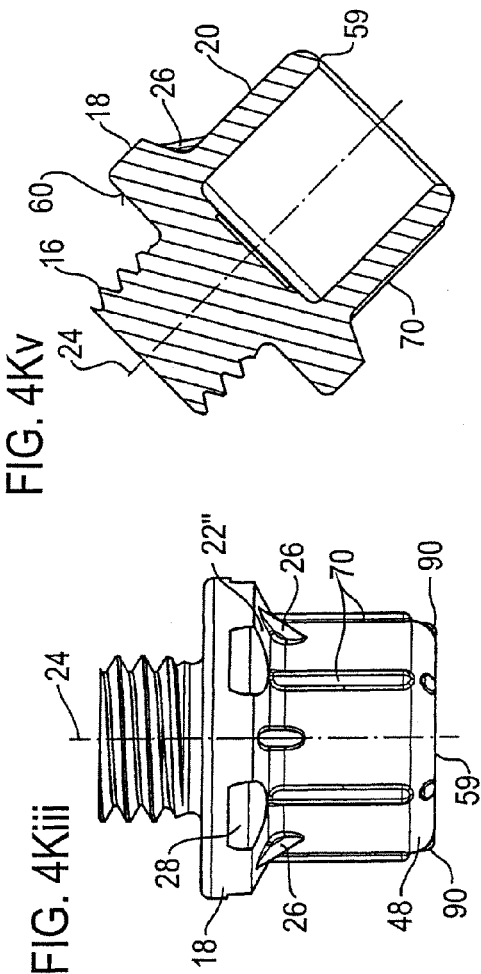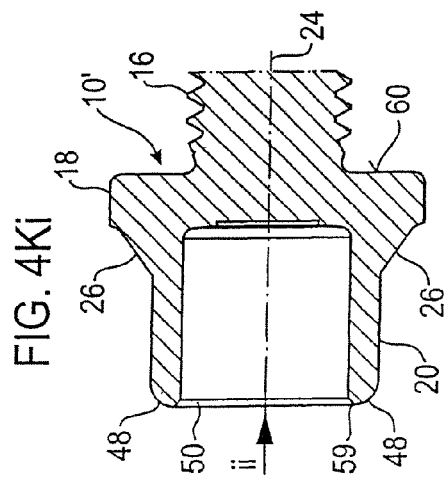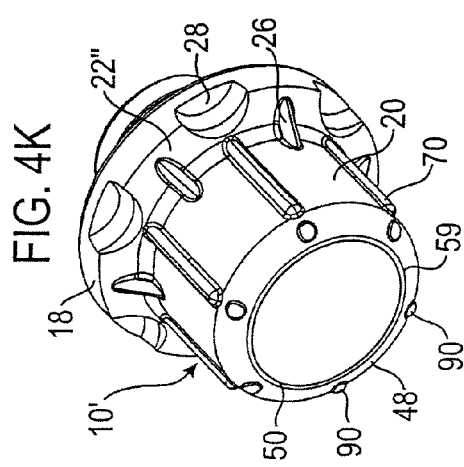

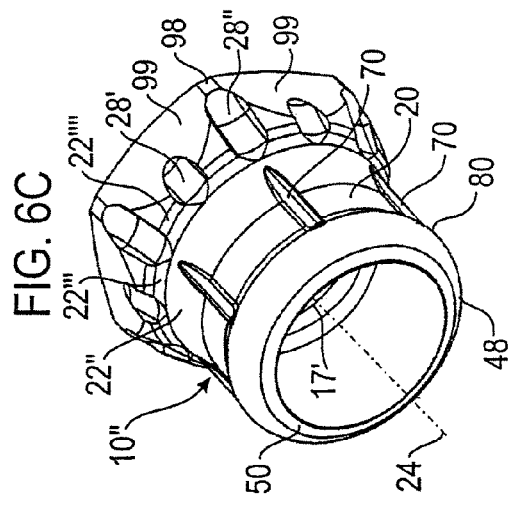
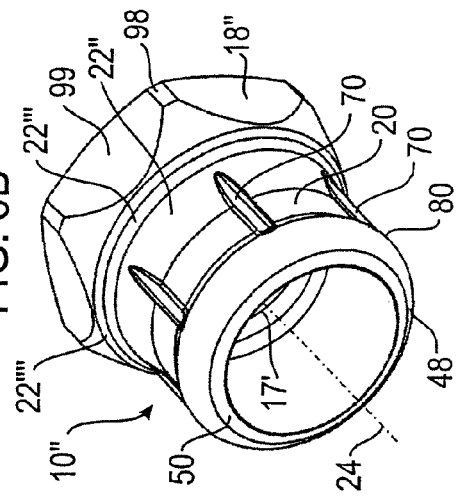
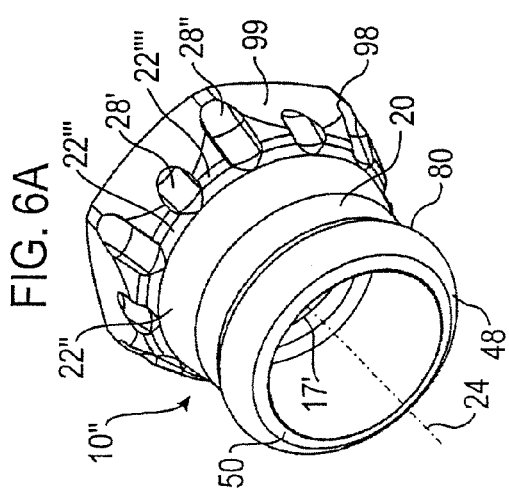
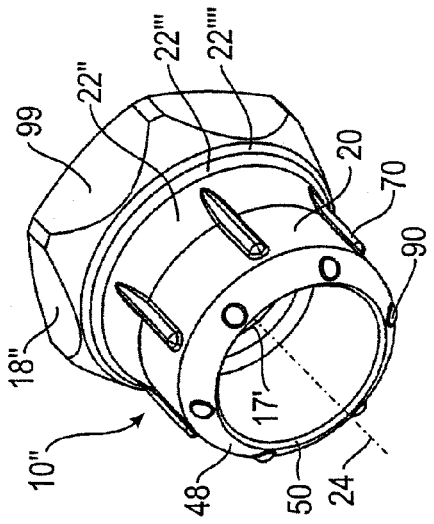
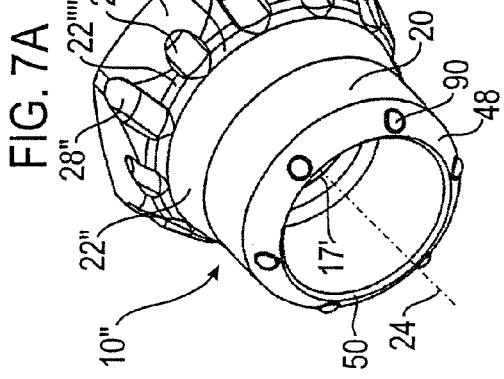

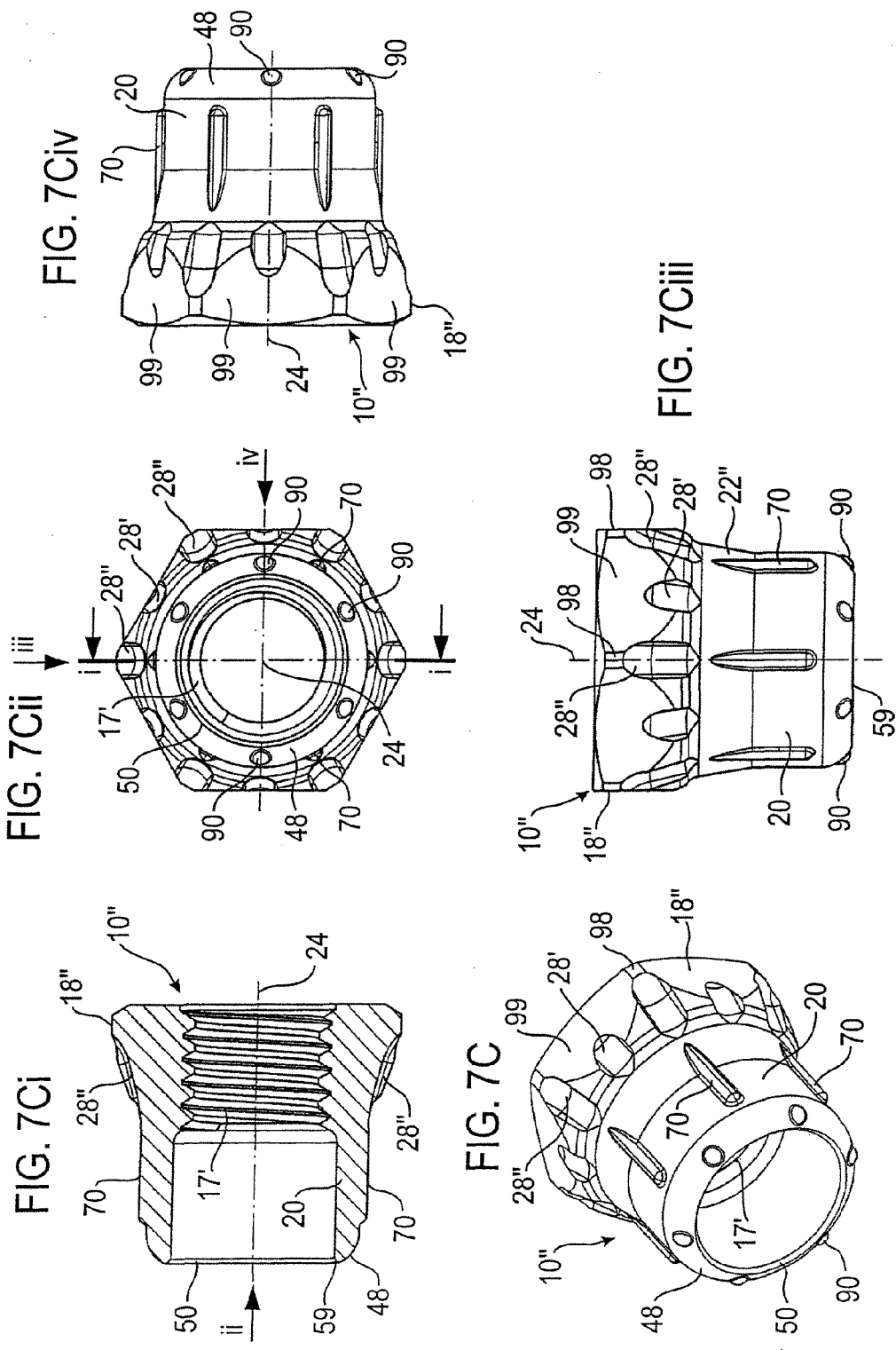

FUNCTIONAL ELEMENT, A COMPONENT ASSEMBLY CONSISTING OF A FUNCTIONAL ELEMENT AND A SHEET METAL PART AND ALSO A METHOD FOR THE ATTACHMENT OF THE FUNCTIONAL ELEMENT TO A SHEET METAL PART

The present invention relates to a functional element having a functional portion, a generally tubular rivet portion and a ring-like sheet metal contact surface. Furthermore, the invention relates to a component assembly consisting of such a functional element and a sheet metal part as well as to a method for the attachment of the functional element to a sheet metal part.

Functional elements of the above named type in the form of fastener elements have been sold by the company Profile Verbindungstechnik GmbH & Co. KG in various forms for many years under the designations SBF, SBK, RSF and RSK. The elements themselves and also a method for the attachment of the elements and the die buttons that are used are described in detail, among other things, in the German patents DE 3447006 C2, DE 3446978 C2, and DE 3835566 C2.

Fastener elements of this kind are either introduced in self-piercing manner into the sheet metal part so that the element has a piercing and/or rivet portion. They can, however, also be introduced into pre-holed metal sheets, with the pre-holing frequently taking place using a so-called preceding hole punch which pierces the sheet metal part directly prior to or during the attachment of the fastener element. This possibility only exists for functional elements which are formed as hollow body elements, for example nut elements, because the holed punch must pass through the fastener element.

The possibility also exists of using functional elements which are provided with a piercing rivet portion in such a way that the sheet metal part is holed by the piercing and/or rivet portion prior to or during the attachment process. When realizing the functional element as a bolt element, the slug which arises in this way is frequently clamped within the tubular rivet portion where it can also exert a support function for the rivet bead. For hollow body elements the piercing slug is normally removed by means of a follow-up ejection pin which is passed through the hollow body element.

Irrespective of whether the corresponding functional element is self-piercing or is used with a pre-holed metal sheet, the piercing and/or rivet portion has to perform not inconsiderable deformation work on the sheet metal part because it has to ensure that the sheet metal part is deformed into a tubular collar in the region of riveted connection. The piercing and/or riveting section is subsequently deformed radially outwardly around the free-standing end of the tubular collar in order to form a recess for receiving the tubular collar, the recess being U-shaped in cross-section. In this connection, the tubular collar is frequently folded back on itself so that a ring-like fold of the sheet metal is present within the U-shaped recess formed by the beaded over rivet portion.

The requirements placed on the piercing and/or riveting section, irrespective of whether these operate with or without pre-holing are thus, on the one hand, to have sufficient stability to be able to perform the required deformation work and, on the other hand, after the formation of the rivet bead, to achieve sufficient strength in the region of the rivet bead that the strength of the connection that is aimed at is ensured. This is necessary for the firm attachment of an article to the sheet metal part. For a fastener element this signifies that the strength of the piercing and/or riveting section must correspond to the strength class of the screw. For the attachment of a fastener element to the sheet metal part the piercing and/or riveting section may not buckle. On the other hand, the deformability must be present so that the piercing and/or riveting section can be reshaped to form the rivet bead which is U-shaped when seen in radial cross-section.

These contrary requirements lead to a situation in which the radial wall thickness of the tubular piercing and/or riveting section must have a clear association with the effective size of the fastener portion. The term "effective size of the fastener portion" will be understood to mean the strength which is required from the fastener element per se.

Even if the said fastener elements have been successfully used in practice for many years, they nevertheless have certain disadvantages, namely that the attachment of the elements, irrespective of whether this takes place with or without pre-holing, can lead to the formation of small chips which, in the course of time, can be trapped in the region of the die buttons or elsewhere in the tools and presses that are used and can lead to jamming and deformation of sheet metal parts that are being processed, which are entirely undesired. The cause for these small chips is extremely difficult to establish because one cannot visualize the creation of the chips in a large press; since the working region consists of solid metal and there is no possibility so to say to provide observation windows which would make it possible to consider the manufacturing process without significantly impairing the course of the manufacturing process.

With the design of the piercing and/or riveting section which is described and claimed in European patent 1430229 one succeeds in substantially suppressing the formation of the chips. Nevertheless, a situation can arise in which the rivet connection in the region of the turned over end of the rivet bead or in the region of the sheet metal edge of the backwardly folded sheet metal part does not always appear perfect and it can above all transpire that the folded back part of the sheet metal part is cut into or pressed in in crescent-like manner by the turned over end of the rivet portion so that parts of the sheet metal project as a chip from the rivet bead or can indeed by fully parted and cause problems in the tooling and leave marks in the sheet metal part.

The object of the present invention is to ensure by special shaping of the piercing and/or riveting section that the sheet metal part which is folded back in the region of the rivet bead is completely covered by the rivet portion, whereby it is no longer possible for parts of the sheet metal to project from the rivet bead as a chip or indeed to be parted off. Furthermore, this object should be satisfied with relatively simple means.

In order to satisfy this object, a functional element of the initially named kind is provided with the special characterising feature that features of shape are provided at the rivet portion to achieve co-movement of the sheet metal part during the formation of the rivet bead, in particular at the free end of the rivet portion and/or at the radially outer side of the rivet portion, at least in the region adjacent the free end of the rivet portion. Through such features of shape it is possible to design the method in such a way, and without having to change the shape of the die buttons that are used from the present shape, that the sheet metal part is co-moved with the rivet bead during the rolling process for the formation of the rivet bead and in this way to ensure that the sheet metal is fully covered over by the rivet portion. In this way it is no longer possible for parts of the sheet metal to project from the rivet bead as a chip or indeed to be parted off.

A multiplicity of features of shape enter into question which can contribute to satisfying the object including:

a) ribs which extend axially at the rivet portion, which extend at least from a region adjacent the contact surface up to at least shortly before the free end of the rivet portion,
b) a bead provided at the free end (59) of the rivet portion and extending radially beyond the outer cylindrical surface of the tubular rivet portion, especially a bead extending as a ring around the tubular rivet portion and
c) locally raised portions and/or recesses at the free end (59) of the rivet portion, which are preferably provided radially outside of a generally conical or rounded inner surface of the free end face.

The above named features can be used alone or in combination.

Other shapes are also conceivable which can have the same action, for example a knurling, in particular cross-knurling at the cylindrical outer surface of the piercing and/or riveting section.

The functional element in accordance with the invention can be realized as a self-piercing element, i.e. the free end of the rivet portion can be used to pierce the sheet metal part. In particular the free end of the rivet portion can have, at the radially inner side, a ring surface which diverges in the direction away from the ring-like contact surface, for example in the form of a conical cutting surface, and can have a rounded drawing surface at the radially outer side. The corresponding shape can be realized in accordance with the above recited German patents, and indeed either in a form such as it is described in the above named German patents, or in accordance with the likewise above named European patent.

Particularly preferred embodiments of the functional element in accordance with the invention can be found in the further subordinate claims 5 to 31.

The present invention relates to a component assembly consisting of a functional element in accordance with the invention and a sheet metal part having an opening and indeed, irrespective of whether the opening is pre-formed or is formed by the piercing and/or riveting section, with the special characterising feature that the ring-like sheet metal contact surface contacts the sheet metal part at one side, in that the rivet portion extends through the opening in the sheet metal part, in that the marginal region of the opening in the sheet metal part is folded back on itself and in that the folded back portion of the marginal region of the sheet metal part is completely covered by the beaded over region of the rivet portion.

It is particularly favourable with a component assembly of this kind that in realizing the above named feature a) of the functional element the ribs are reflected in the marginal region of the opening of the sheet metal part, i.e. form corresponding depressions there. Through the cooperation between the ribs and the depressions in the sheet metal part an additional security against rotation is achieved.

In a component assembly of the above named kind, it is also of advantage that in realizing the feature b) the bead engages around the folded back portion of the marginal region of the sheet metal parts at its radially outer boundary. In this way the bead, so to say, folds a stop for the folded back portion of the marginal region of the sheet metal part and in this way prevents the sheet metal projecting beyond the free ring edge of the folded back sheet metal part.

When realizing the above designated feature c) the raised portions and recesses at the free end of the piercing and/or riveting section are also reflected in the sheet metal part, i.e. form corresponding recesses or projections there and likewise offer increased security against rotation.

The method for the attachment of the functional element in accordance with the invention and having a tubular rivet portion, in which the rivet portion is passed through an opening in the sheet metal part within a collar region of the sheet metal part and is rolled over by means of a die button having a generally rounded rolling surface, which is circular in plan view, in order to form a transverse approximately U-shaped rivet bead, is characterised in that features of shape are provided at the rivet portion which move the sheet metal part with them during the rolling movement. A further method of satisfying the object can be found in claim 37.

Figure 2D:
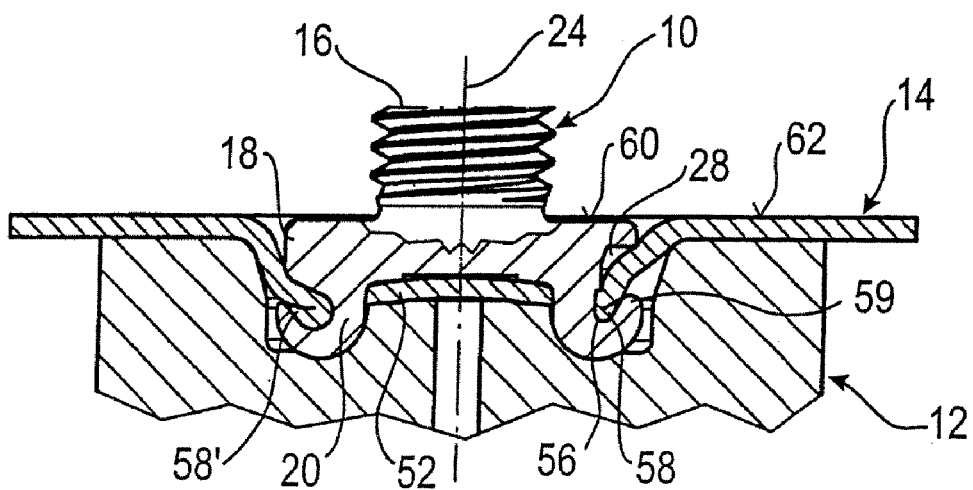
Figure 4A:
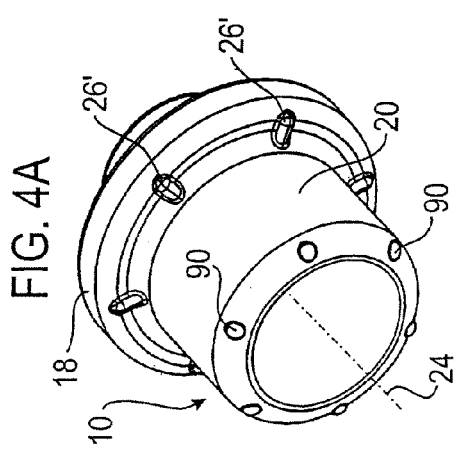

The invention will be explained in more detail in the following with reference to embodiments and to the accompanying drawing in which are shown:

FIGS. 1A and 1B two different phases of the attachment of a customary SBF bolt element to a sheet metal part in order to explain the problem in the region of the rivet bead, with both FIG. 1A and also FIG. 1B including an enlarged illustration of the region of the rivet bead, FIGS. 2A and 2B two drawings corresponding to FIGS. 1A and 1B but of an element in accordance with the invention in which the desired formation in accordance with the invention in the region of the rivet bead arises, with the element of FIGS. 2A and 2B having ribs at the outer side in accordance with the invention, FIGS. 2C and 2D drawings which are similar to those of FIGS. 2A and 2B but which show the processing of a bolt element in accordance with FIG. 2G, FIGS. 2E to 2O different embodiments of the rivet portion or piercing and/or riveting section of the bolt element of the invention which are all provided with ribs at the outer jacket surface of the rivet portion, FIGS. 3A to 3L various embodiments of bolt elements in accordance with the invention which are provided with a ring bead in the region of the free end of the rivet portion, FIGS. 4A to K various embodiments of bolt elements in accordance with the invention which are provided with local raised portions at the free end of the rivet portion, with the FIGS. 4Ii to 4Iv showing various representations of the element in accordance with FIG. 4I, and indeed in FIG. 4Ii a longitudinal section in accordance with the section plane i-i of FIG. 4Iii, in FIG. 4Iii an end view of the free end of the rivet portion in the direction of the arrow ii of FIG. 4Ii, FIG. 4Iiii a side view of the head part of the element in accordance with the arrow direction iii of FIG. 4Iii, FIG. 4Iiv a side view of the head part of the element in accordance with the arrow iv of FIG. 4Iii and FIG. 4Iv a longitudinal section of the element in accordance with FIG. 4I corresponding to the section plane v-v of FIG. 4Iii and FIGS. 4Ki to 4Kv corresponding representations to those of FIG. 4Ii to 4Iv but of the element 4K, FIGS. 5A-5C perspective illustrations of three nut elements in accordance with the invention which are provided with axially extending ribs at the rivet portion, FIGS. 6A-6C perspective illustrations of different nut element in accordance with the invention which are all provided with a ring bead at the free end of the rivet portion, FIGS. 7A-C representations of different embodiments of nut elements in accordance with the invention which are all provided with raised portions at the free end of the rivet portion, with the FIGS. 7Ci to 7Civ showing various representations for the element of FIG. 7C analogous to the representations of the FIGS. 4Ii to 4Iiv.

In all the examples explained the same reference numerals are used for the same features or same shaped features, optionally with a prime or a double prime when it is necessary to distinguish one embodiment from a previous embodiment.

It will be understood that all descriptions which are given in connection with the individual features also apply to all other features of shape or embodiments in which the same reference numerals are used, irrespective of whether the corresponding reference numerals are provided with or without a prime. Thus, unnecessarily long repetitive descriptions of individual features can be avoided.

Referring to FIGS. 1A and 1B it is shown how an SBF bolt element known per se can be introduced in accordance with the German patent DE 3447006 C2 in self-piercing manner into a sheet metal part 14 by means of a die button 12. The bolt element 10 consists of a shaft part 16 having a thread 17 and a head part 18 with a tubular rivet portion 20 at the side of the head part remote from the shaft part 16, with the tubular rivet portion 20 merging into a ring-like contact surface 22 of the head part 18 and with the shaft part 16, the head part 18 and the tubular rivet portion being arranged concentrically to the central longitudinal axis 24 of the element 10. In the region of the ring-like sheet metal contact surface 22 there are noses 26 providing security against rotation, in this example six in number, which are obliquely set and bridge the transition from the tubular rivet portion 20 into the ring-like contact surface 22.

Between the noses 26 providing security against rotation there are recesses 28 in the ring-like contact surface 22, likewise six in number, which are located in each case between two noses providing security against rotation and likewise uniformly arranged around the central longitudinal axis 24 of the element 10. One can see from the representation of FIG. 1A that the ring-like contact surface 22 is here slightly conical.

The die button 12 has at the free end face 30, which supports the sheet metal part 14, a ring-like recess 32 having a central cylindrical projection 34 which merges via a gently rounded, radially outwardly directed so called rolling surface 36 into the base surface 38 of the ring recess 32. The base surface 38 in turn merges via a radius 40 into a cylindrical wall region 42 of the recess 32. This cylindrical wall region 42 subsequently merges via a slightly rounded portion 43 into a wall 44 which diverges conically in the direction towards the head part 18 of the bolt element and subsequently merges via a rounded edge 46 into the free end face 30 of the die button.

The use of the die button 12 with a self-piercing element in the form of an SBF bolt in order to form the rivet bead is extremely well known in practice and also from the above named German patent documents.

In general, the free end of the tubular rivet portion 20, which has a rounded drawing surface 48 at the outside and a small conical cutting surface 50 at the inside, is used in order to first of all indent the sheet metal part 14 in the region of the ring-like recess 32 and to draw it downwardly into a collar 15 until the sheet metal part meets the free end of the central cylindrical post 34 of the die button, whereby the piercing slug 52 is cut out of the sheet metal part. During this, the free end of the tubular rivet portion 20 is pushed through the hole in the sheet metal part which arises in this way and is rolled outwardly by means of the rounded rolling surface 36 up to and into the position which is evident from FIG. 1B. One can see from FIG. 1B that the tubular rivet portion is beaded over by the collaboration with the ring-like rolling surface 36 to form a U-shaped recess 56 in which the collar region 58 of the sheet metal part, which is folded back on itself, is received. One can see, in particular from the enlarged representation at the bottom right in FIG. 1B, that a part 58' of the folded back collar region 58 of the sheet metal part is located outside of the beaded over free end 59 of the tubular rivet portion and in principle forms a ring-like chip there. In practice, the formation often takes place in such a way that the ring-like folded over end region 59 of the tubular rivet portion 20 is pressed deep into the backwardly folded collar region 58' whereby the backwardly folded collar region is located radially outside of the beaded over free end 59 of the rivet portion and is only connected to the sheet metal part via a very small web. This can go so far that the small web is torn or that the backwardly folded sheet metal part has radial cracks whereby it is possible that arcuate or crescent-shaped regions of the backwardly folded collar are separated from the sheet metal part and can migrate further into the tools of the press which are used for the attachment of the element.

One can also see from FIG. 1B that the piercing slug 52 is fixedly clamped or jammed inside the tubular rivet portion 20 as a result of the design of the central cylindrical post 34 of the die button, and indeed staked or caulked there, so that after the removal of the component assembly out of the press and from the die button, i.e. removal of the sheet metal part 14 with the bolt element 10 riveted thereto, the piercing slug is located within the beaded over tubular rivet portion such that it cannot be lost, and indeed also stiffens this region of the component assembly.

In practice, the sheet metal part 14 is normally pressed with a hold-down member of the setting head (not shown) against the free end 30 of the die button so that the sheet metal part remains flat in this region. One can also see from FIG. 1B that the ring-like support surface 60 of the bolt element 10 is aligned with the upper side 62 of the sheet metal part in FIG. 1B or is fractionally set back relative to the latter. This has the advantage that in the screw-on situation, in which a further component is arranged over the shaft part of the bolt element and is secured to the component assembly (10+14) by means of a screwed-on nut, sits flat on the sheet metal part 14 and on the support surface 60 of the bolt element.

The FIGS. 2A and 2B now show how, by using a bolt element 10' in accordance with the invention corresponding to FIG. 2L, the folded back region 58 or 58' of the collar 15 comes to lie completely within the U-shaped recess or mount 56, i.e. radially within the free end 59 of the beaded over tubular rivet portion 20. The bolt element 10' corresponding to FIG. 2L has the same noses 26 providing security against rotation and recess 28 providing security against rotation as the SBF element 10 of FIGS. 1A and 1B, it has, however, additionally longitudinal ribs 70 of rounded shape and six in number at the outer surface of the tubular rivet portion which extend in the axial direction and are aligned angular-wise with the recesses 28 in the head part of the element, i.e. are arranged with the same angular pitch around the central longitudinal axis 24 of the bolt element.

It has been shown that these features of shape in the form of longitudinally directed ribs 70 also dig into the collar region 15 of the sheet metal part 14 during the formation thereof and so to say force the sheet metal part to move with the tubular rivet portion 20 during its beading over, so to say free of slippage, whereby the desired formation in the sense of the encapsulated folded back sheet metal part 58' of the collar region 15 is achieved.

It is not essential that the bolt element has the ribs 26 providing security against rotation and the recesses 28 providing security against rotation of FIG. 2L, on the one hand, because the longitudinal ribs 70 likewise form a security against rotation relative to the sheet metal part and, on the other hand, because a security against rotation is either not necessary for some applications, for example when the shaft part 16 of the bolt element 10' is a cylindrical bearing surface without a thread, or because the security against rotation is achieved with other means, for example by an adhesive which is provided at the ring-like contact surface 22 and at the outer surface of the tubular rivet portion 20, which cures under pressure and which serves for an adhesively bonded connection between the head part 2 of the element and the sheet metal part.

The FIGS. 2E to 2K and also 2M and 2N show different possibilities for realizing functional elements in bolt form with longitudinal ribs or modified longitudinal ribs such as 70. At this point it should also be noted that the elements of FIGS. 2E to 2N could be nut elements instead of bolt elements. Then an internal thread would be provided in the head part of the element axially above the tubular rivet portion (not shown here).

FIG. 2E shows a simple embodiment in which no features providing security against rotation are provided other than the ribs 70 extending in the axial direction which are provided at the radially outer surface of the tubular rivet portion.

In the embodiment of FIG. 2F the six longitudinal ribs 70 are supplemented by six noses 26' providing security against rotation which are respectively arranged at the centre between two adjacent longitudinal ribs 70. In this respect, the noses 26' providing security against rotation bridge the ring-like contact surface 22 and subdivide it into six arcuate regions 22'.

In the embodiment of FIG. 2G, recesses 28 are provided in the head part 18 of the bolt element in addition to the ribs 70 directed in the axial direction, with the recesses 28 locally interrupting the ring-like contact surface 22. The FIGS. 2C and 2D show how a bolt element in accordance with FIG. 2G can be attached in accordance with the invention to a sheet metal part and are very similar to FIGS. 2A and 2B. One notes at the right side of FIG. 2D that the sheet metal/head part connection in the region of the recess 28 is slightly different from the connection at the left-hand side in the region between two recesses 28 or two longitudinal ribs 70. In both regions, the folded back sheet metal part 58', i.e. the folded back region of the ring collar 15, is located fully within the U-shaped recess 56 which is formed by the beaded over rivet portion 20, i.e. the backwardly folded part 58' is so to say encapsulated by the beaded over rivet portion 20 in all regions.

The design in accordance with FIG. 2H corresponds largely to that of FIG. 2G is, however, additionally supplemented with noses 26' providing security against rotation which are arranged in the manner which is shown and described in connection with FIG. 2F.

In the embodiment in accordance with FIG. 2I the basic shape of the design of FIG. 2H is retained but the longitudinal ribs 70 are extended at their ends adjacent to the free end face of the tubular rivet portion 20 over the rounded surface of the free end of the tubular rivet portion 20, i.e. extending by the additional region 70' in FIG. 2I. In this way, a functional element is so to say provided which not only has ribs extending axially at the rivet portion, which extend at least from a region adjacent the contact surface 22' up to shortly before the free end 59 of the rivet portion, but rather are extended beyond this so that they form locally raised portions at the free end of the rivet portion in the region of the rounded drawing surface 48 which are provided radially outside of a generally conical or rounded inner surface 50 of the free end.

In the embodiment of FIG. 2J ribs 70 extending only axially at the rivet portion are provided in accordance with the embodiment of FIG. 2E. The head part 18 is, however, differently realized and indeed in that here a pronounced conical contact surface 22" is provided.

In the embodiment of FIG. 2K the axially extending ribs 70 at the tubular rivet portion of FIG. 2J are supplemented by recesses 28 providing security against rotation which are arranged in the same radial planes as the longitudinal ribs 70, i.e. the recesses 28 providing security against rotation are aligned in the radial direction with the axially extending ribs and positioned such that they locally interrupt the conical contact surface 22".

In the embodiment of FIG. 2L, the embodiment of FIG. 2J is further developed in that noses 26 providing security against rotation are provided at the head part which bridge the transition between the tubular rivet portion and the conical sheet metal contact surface 22". The noses 26 providing security against rotation are here disposed in each case at the centre between adjacent axially extending ribs 70. In FIG. 2M the design of FIG. 2L is supplemented by recesses 28 as in FIG. 2K.

The embodiment in accordance with FIG. 2N corresponds essentially to that of FIG. 2M, except that in this embodiment a tubular rivet portion with a polygonal cross-section, more precisely with twelve sides 20' is used, with the internal hollow space of the rivet portion 20' being formed in the polygonal shape with likewise twelve sides. Here, the longitudinal ribs 18 are arranged at each second corner which is in each case formed by two adjacent side surfaces of the tubular rivet portion 20'.

The head part 18' is also of polygonal shape and likewise has twelve side surfaces.

Finally, FIG. 2O shows an embodiment similar to FIG. 2M having noses 26 providing security against rotation and recesses 28 providing security against rotation in which, however, the axially extending ribs 70 at the rivet portion 20 are likewise continued over the rounded surface 48 at the free end 59 of the tubular rivet portion 20 in accordance with the embodiment of FIG. 2I and there form raised portions 70' in accordance with FIG. 2I.

The FIGS. 3A to 3L show embodiments of bolt elements which have one common feature, and indeed in form of a bead 80 provided at the free end of the tubular rivet portion and extending radially outwardly beyond the outer cylindrical surface of the tubular rivet portion.

At this point it should be noted that the elements of FIGS. 3A to 3L could also be nut elements instead of bolt elements. Then an internal thread would be provided in the head part 14 of the element axially above the tubular rivet portion (not shown here).

In the embodiment of FIG. 3A this ring bead 80 is used with a bolt embodiment in accordance with FIG. 2F but without longitudinal ribs 70 which extend in the axial direction. That is to say that the element also has noses 26' providing security against rotation which radially bridge the ring-like sheet metal contact surface 22, i.e. bridge this and subdivide it into six uniformly distributed curved regions 22'.

In FIG. 3B these noses 26' providing security against rotation are supplemented by recesses 28 precisely as when used for example in the FIG. 2H embodiment. Here, the six recesses 28 are also arranged shifted by half a pitch relative to the noses 26' providing security against rotation, i.e. each recess 28 is located at the centre between two adjacent noses 26'.

In the embodiment of FIG. 3C the basic form of the bolt element described in conjunction with FIG. 2J is used, i.e. with the pronounced conical contact surface 22", but without the ribs 70 extending in the axial direction in accordance with FIG. 2J.

In accordance with the embodiment of FIG. 3C, noses 26 providing security against rotation are again used which bridge the transition between the tubular rivet portion 20 and the conical contact surface 22.

In the embodiment of FIG. 3D the basic embodiment of FIG. 2M is again used, however here the longitudinal ribs 70 extending in the axial direction are omitted and are replaced by the ring bead 80.

The embodiment of FIG. 3E is very similar to that of FIG. 2J but the longitudinal ribs 70 are supplemented by the ring bead 80, and indeed in such a way that the longitudinal ribs 70 merge adjacent to the ring bead 80 into this bead at the free end of the tubular rivet portion 20 into this bead. One can see that here the ribs 70 extending in the axial direction do not extend radially beyond the ring bead.

The embodiment of FIG. 3F is very similar to the embodiment of FIG. 3D except that here the recesses 28 providing security against rotation are omitted and the longitudinal ribs 70 are added at the same angular positions as the recesses 28 in FIG. 3D and designed in the same way as in FIG. 3E. Noses 26 providing security against rotation which bridge the transition between the tubular rivet portion 20 and the conical contact surface 22" are also used here.

In the embodiment of FIG. 3G, these noses 26 providing security against rotation are omitted and are replaced by recesses 28 which lie in the same radial planes as the longitudinal ribs 70 extending in the axial direction.

In FIG. 3H the noses 26 providing security against rotation are introduced again, i.e. used in addition to the recesses 28 of the FIG. 3G and here the noses 26 providing security against rotation are arranged shifted by a half pitch relative to the recesses 28, i.e. in each case arranged between two adjacent longitudinal ribs 70 extending in the axial direction.

In FIG. 3I the embodiment of FIG. 3A is again used except that here additional ribs 70 providing security against rotation are used which extend in the axial direction.

In the embodiment of FIG. 3J the noses 26' of the embodiment of FIG. 3I providing security against rotation are omitted. They are replaced in FIG. 3K by recesses 28 providing security against rotation which lie in the same radial planes as the longitudinal ribs 70 extending in the axial direction.

In the embodiment of FIG. 3L the embodiment of FIG. 3K is supplemented by the noses 26' providing security against rotation.

The embodiments of FIGS. 4A to FIG. 4K have as a common feature the locally raised portions 90 at the free end 59 of the tubular rivet portion 20, more precisely stated at the rounded drawing surface 48.

At this point it should be pointed out that the elements of FIGS. 4A to 4K could be nut elements instead of bolt elements. Then an internal thread would be provided in the head part 14 of the element axially above the tubular rivet portion (not shown here).

In the embodiment of FIG. 4A the head shape with the narrow conical ringlike contact surface 22 is used similarly to the embodiment of FIG. 2F except that the longitudinal ribs 70 of FIG. 2F are replaced by raised portions 90.

Figure 4B:
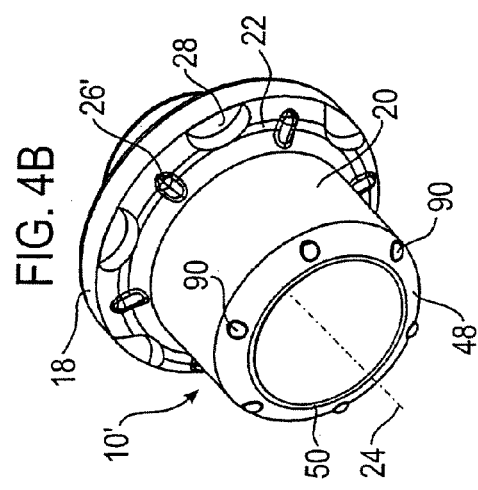

In the embodiment of FIG. 4B the recesses 28 providing security against rotation are additionally used in addition to the noses 26' providing security against rotation of FIG. 4A, are aligned in radial planes with the local raised portions 90 and are each disposed at the centre between two adjacent noses 26' providing security against rotation.

Figure 4C:
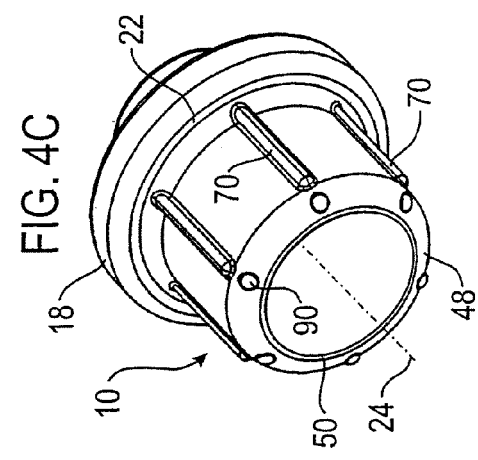

In the embodiment of FIG. 4C the basic design is similar to FIG. 4A except that here the noses 26 providing security against rotation are omitted and the local raised portions 90 at the free end of the rivet portion are simultaneously used with longitudinal ribs 70 extending in the axial direction at the tubular rivet portion which are aligned in the radial planes of the locally raised portions.

Figure 4D:
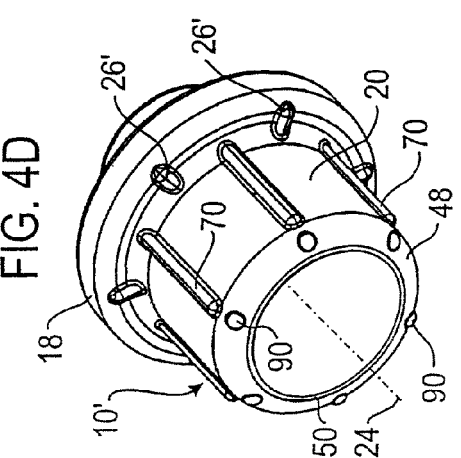

In FIG. 4D both the noses 26' of FIG. 4A providing security against rotation and also the longitudinal ribs 70 extending in the axial direction of the tubular rivet portion 20 are used.

Figure 4E:
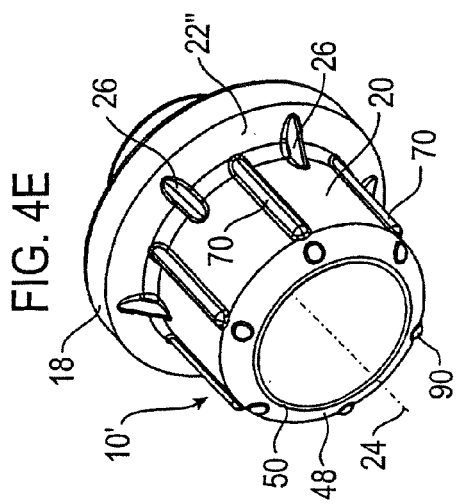

In FIG. 4E the basic shape of the bolt element 10' with a pronounced conical contact surface 22" is used with longitudinal ribs 70 and with noses 26 providing security against rotation here bridging the transition from the tubular rivet portion 20 into the conical ring-like contact surface 22". Here, the noses 26 providing security against rotation are also used shifted by a half pitch relative to the locally raised portions 90 at the free end of the rivet portion, whereas the longitudinal ribs 70 are aligned with them.

Figure 4F:
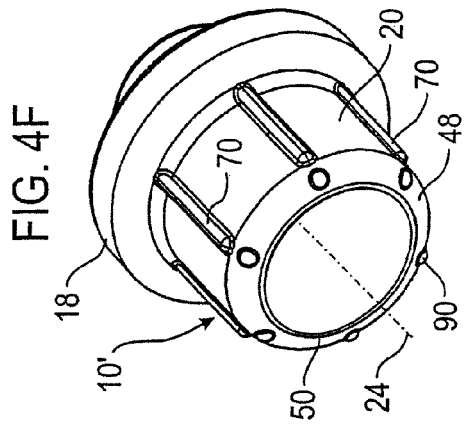

In FIG. 4F the same basic embodiment of the bolt element is used as in FIGS. 4E and 2J but, instead of the noses 26 providing security against rotation in FIG. 4E, only the longitudinal ribs 70 extending in the axial direction are used at the tubular rivet portion 20.

In the embodiment of FIG. 4G the embodiment of FIG. 4E is used but without the ribs 70 extending in the longitudinal direction.

In the embodiment of FIG. 4H an embodiment is used similar to FIG. 4G but additionally provided with recesses 28 providing security against rotation which interrupt the conical contact surface 22", with the recesses 28 being disposed in the same radial planes at the raised portions 90 at the free end 59 of the tubular rivet portion 20.

The embodiment of FIG. 4I corresponds essentially to that of FIG. 4B but is additionally supplemented with longitudinal ribs 70 extending in the axial direction of the tubular rivet portion.

The embodiment of FIG. 4J is similar to that of FIG. 4I except that here the polygonal basic shape of the tubular rivet portion in accordance with FIG. 2M is used.

The precise design of the embodiment of FIG. 4K can be seen from FIGS. 4Ki to 4Kv, it corresponds essentially to the embodiment of FIG. 4B but is additionally supplemented with the longitudinal ribs 70 which lie in the same radial planes as the raised portions 90 and the recesses 28.

FIGS. 5A to 5C show nut elements 10" which all have in common axially extending longitudinal ribs 70 at the tubular rivet portion. In FIG. 5A these longitudinal ribs 70 are used in principal without additional features providing security against rotation if one ignores the polygonal outer shape 96 of the head part 18" at the element which, with a corresponding attachment to the sheet metal part, i.e. on the countersinking of the head part within the sheet metal part likewise ensure a certain security against rotation relative to the sheet metal part.

One can see here that the nut element has a pronounced contact surface 22" and that the ends of the longitudinal ribs 70 adjacent the head part of the element run out from this contact surface and terminate there. Radially outside of the pronounced contact surface there are two further ring-like and conical contact surfaces 22'" and 22"", which are however relatively narrow in comparison to the contact surface 22". These surfaces 22'", 22"" are not interrupted in this example of FIG. 5A by features providing security against rotation.

In contrast, in the embodiment of FIG. 5B, recesses 28' and 28" are provided. In this arrangement the longer recesses 28', which are arranged in the same radial planes as the longitudinal ribs 70 and which at least partly interrupt the edges 98 in the side surfaces 99 of the polygonal head part 18" are so arranged that they interrupt the two narrow conical surfaces but do not extend into the broad conical surface.

The short recesses 28" which are disposed between the longer recesses 28' and which partly interrupt the side surfaces 99 of the polygonal head part of the element likewise interrupt the two narrow conical contact surfaces 22''', 22'''' but not however the broad conical contact surface 22''.

In the embodiment of FIG. 5C the axially extending longitudinal ribs 70 at the tubular rivet portion are extended in accordance with the extensions 70' of FIG. 2I so that the extensions 70' form raised portions at the rounded drawing surface 48 of the free end of the tubular rivet portion 20.

The FIGS. 6A to 6C again show nut elements, however, now with the basic formation of a ring bead 80 at the free end of the tubular rivet portion 20. The basic shape of the nut element corresponds, apart from the ring bead, to the basic shape of the embodiments of FIGS. 5A to 5C. More specifically, the embodiment of FIG. 6A has alternating longer and shorter recesses 28', 28'' providing security against rotation which are designed precisely as in FIG. 5B.

In the embodiment of FIG. 6B longitudinal ribs 70 extending in the axial direction are used instead of the longer and shorter recesses 28', 28'' providing security against rotation and run out at their ends adjacent the head part at the broad conical surface and merge at their ends adjacent the free end of the tubular rivet portion into the ring bead without projecting radially beyond this ring bead.

In FIG. 6C the longitudinal ribs extending in the axial direction in accordance with FIG. 6B are used together with the alternating longer and shorter recesses 28', 28'' of FIG. 6A.

Finally, FIGS. 7A to 7C again show nut elements 10'' with the same basic shape as that of FIGS. 5A to 5C and 6A to 6C but here with the common feature of discrete raised portions 90 at the free end of the tubular rivet portion 20, more precisely at the rounded drawing surface 48 of the free end of the tubular rivet portion. Here, as in the other embodiments shown, the discrete local raised portions 90 have a circular shape in plan view, which is, however, not absolutely essential. For example, elongated, oval raised portions or raised portions which are star-like or polygonal in plan view could be used. Also, instead of using raised portions, local recesses could also be provided as in other embodiments, which would then look similar to the local raised portions but would be concave instead of projecting.

In the embodiment of FIG. 7A the local raised portions are used in combination with alternating longer and shorter recesses 28', 28'' providing security against rotation at the head part of the element, which are designed in precisely the same way as in the embodiment of FIGS. 5B and 6A.

In the embodiment of FIG. 7B the alternating recesses 28', 28'' providing security against rotation are not provided. Instead of this, longitudinal ribs 70 extending in the axial direction at the tubular rivet portion are used which correspond precisely in shape to those of FIG. 5A.

Finally, FIG. 7C shows, as do also the detailed representations in accordance with FIGS. 7Ci to 7Civ, an embodiment in accordance with FIG. 7B but in combination with alternating recesses 28', 28'' providing security against rotation at the head part of the element 10''.

In all embodiments features of shape which represent raised portions such as for example ribs 70 extending in the longitudinal direction, their extensions 70' or the raised portions 90 at the free end of the tubular rivet portion are provided with gently rounded contours in order to avoid an unnecessary injury to the sheet metal part. In contrast, the embodiment with the ring bead have a relatively sharp-edged design of the ring bead at the radially broadest point and can be used without injury to the sheet metal part having to be feared. If recesses such as 28, 28', 28'' are used, then these can merge in sharp-edged manner into the outer jacket surface of the respective element, however, the base region of the recesses should be rounded, although in many cases the sheet metal material does not come into contact there because the sheet metal material does not fully fill out the corresponding recesses.

Although in all the indicated embodiments it is always six features of shape such as 70, 90, 26, 26', 28, 28', 28'' that are shown this is admittedly reasonable but in no way to be considered to be restrictive. In place of this, fewer or more such features of shape can be provided which are normally, but not necessarily, uniformly distributed around the central longitudinal axis.

Furthermore, it should also be stated that the present invention can also be used with other functional elements which are provided with a tubular rivet portion such as, for example, elements with an under head design as in the RND element of the company Profil Verbindungstechnik GmbH & Co. KG or with a rivet portion in accordance with the skirt nut or skirt bolt element of the same company.

In particular, the functional element can have a ring-like contact surface with at least one ring-like region which lies in a radial plane perpendicular to the central longitudinal axis of the functional element.

Furthermore, a ring-like groove can be provide radially inside a ring-like region of the ring-like contact surface which lies in a radial plane perpendicular to the central longitudinal axis and which extends around the rivet portion and optionally forms a part of the contact surface. In this embodiment the ring-like groove can have a surface set obliquely to the central longitudinal axis at the radially outer side, i.e. the groove would be at least approximately V-shaped in cross-section.

Also ribs providing security against rotation extending in the radial direction could be provided in the ring-like groove and could bridge the latter partly or completely.

It would also be conceivable to provide cut-outs which interrupt the radially outer side of the ring-like groove and the ring-like region of the contact surface between the ribs providing security against rotation.

Furthermore, a functional element could be provided which is characterised in that a head section having the ring-like contact surface is provided, in that the shaft part of the bolt element is arranged at the same side of the head part as the ring-like contact surface and projects away from the latter and in that the tubular rivet portion is disposed radially within the ring-like contact surface and radially outside of the shaft part.

A nut element could also be provided which is characterised in that a head section having the ring-like contact surface is provided which merges into a tubular hollow shaft part projecting away from the head section at the side of the contact surface, the shaft part being surrounded by the tubular rivet portion, with the free end face of the shaft part being further removed from the ring-like contact surface than the free end of the rivet portion.

In this embodiment the free end of the shaft part could be designed to pierce a sheet metal part.

In an element of this kind, a thread can be provided in the head section and also in the region of the shaft part adjacent the head section. When a conical contact surface is provided, the element could be designed and attached in accordance with the European patent application 02730181.1 or in accordance with the document WO 03/089187.

In all embodiments, materials can be named by way of example for the material of the section and for the functional elements which are manufactured from it which achieve strength values of class 8 in accordance with the ISO Standard or higher in the context of cold deformation, for example a 35B2 alloy in accordance with DIN 1654. The fastener elements formed in this way are also suitable for all commercially available steel materials for drawing quality sheet metal parts and also for aluminium or its alloys. Aluminium alloys, in particular those of higher strength, can also be used for the section or for the functional elements, for example AlMg5. Sections or functional elements of higher strength magnesium alloys, such as for example AM50, can also be considered.

The invention claimed is:

1. A functional element (10'; 10") having a functional portion (16; 17; 17'), a generally tubular rivet portion and a ring-like sheet metal contact surface (22; 22'; 22"; 22", 22''', 22''''),
   wherein features of shape (70; 70, 70'; 90; 90, 70) are provided at a free end of the rivet portion (20) away from the sheet metal contact surface, the features of shape being adapted to ensure co-movement of a sheet metal part (14) during the formation of a rivet bead and being provided at at least one of the free end (59) of the rivet portion and the radially outer side of the rivet portion (20), in the region adjacent the free end (59) of the rivet portion (20), wherein recesses (28) providing security against rotation are located in the region of the transition from the rivet portion (20) into a ring-like contact surface (22, 22'; 22") and are axially aligned with said features of shape provided at the free end of the rivet portion.

2. The functional element in accordance with claim 1, wherein at least one of the following features of shape (70; 70, 70'; 90; 90, 70) is provided:
   a) axially extending ribs (70; 70, 70') at the rivet portion, which extend at least from a region adjacent the contact surface (22; 22'; 22"; 22", 22''', 22'''') up to immediately before the free end (59) of the rivet portion (20),
   b) locally raised portions (70'; 90) at the free end (59) of the rivet portion (20).

3. The functional element in accordance with claim 1, wherein the functional element is a self-piercing element (10'; 10") and is designed at the free end (59) of the rivet portion (20) for the piercing of a sheet metal part.

4. A functional element in accordance with claim 2, wherein the features a) and b) are present,
   wherein the raised portions (70', 90) at the free end (59) of the rivet portion (20) are axially aligned with the axially extending ribs (70).

5. The functional element in accordance with claim 2, wherein the features a) and b) are present and the raised portions (70') are formed at the free end (59) of the rivet portion (20) by the ends of the radially extending ribs (70) which run out at the free end (59).

6. The functional element in accordance with claim 2, wherein the ribs (70) in accordance with feature a) have a rounded shape in cross-section.

7. The functional element in accordance with claim 2, wherein on realizing the feature b) the local raised portions (90) are at least approximately circular in plan view.

8. The functional element in accordance with claim 7, wherein the raised portions (90) are of convex shape.

9. The functional element in accordance with claim 2, wherein at least one of the axially extending ribs (70) in accordance with feature a) and the raised portions (70'; 90) in accordance with feature b) are uniformly distributed around the central longitudinal axis (24) of the functional element (10'; 10").

10. The functional element in accordance with claim 2, wherein the number of ribs (70) and the number of the raised portions (70'; 90) lies between 3 and 24.

11. The functional element in accordance with claim 1, wherein cut-outs (28) are provided in a head part (18; 18'; 18") or a flange region of the functional element (10'; 10"), project at least partly radially into the ring-like contact surface (22; 22'; 22"; 22", 22''', 22'''') open in the direction radially outwardly and have their largest cross-sectional dimensions at the radially outer surface of the head part (18; 18'; 18").

12. The functional element in accordance with claim 1, wherein the ring-like contact surface (22; 22'; 22"; 22", 22''', 22'''') is a conical surface apart from any noses (26; 26'; 28; 28, 28', 28") providing, security against rotation and any cut-outs 28.

13. The functional element in accordance with claim 1, wherein the ring-like contact surface has at least one ring-like region which lies on a radial plane perpendicular to the central longitudinal axis (24) of the functional element.

14. The functional element in accordance with claim 1, wherein a ring-like groove is provided radially inside the ring-like region of the ring-like contact surface, which lies in a radial plane perpendicular to the central longitudinal axis, with the groove extending around the rivet portion (20).

15. The functional element in accordance with claim 14, wherein the ring-like groove has at the radially outer side a surface which is obliquely set relative to the central longitudinal axis, i.e. the groove is at least approximately V-shaped in cross-section.

16. The functional element in accordance with claim 14, wherein ribs providing security against rotation, which extend in the radial direction, are provided in the ring-like groove and partly or completely bridge the latter.

17. The functional element in accordance with claim 16, wherein cut-outs 28, which interrupt the radially outer side of the ring-like groove and the ring-like region of the contact surface, are provided between the ribs providing security against rotation.

18. The functional element in accordance with claim 1, wherein it is a bolt element (10') having a shaft part (16).

19. The functional element in accordance with claim 18, wherein a head part (18; 18') is provided, with the tubular rivet portion (40) being provided on the one side of the head part (18, 18') and the shaft part (16) being provided on the other side of the head part (18, 18') and with the ring-like contact surface (22; 22'; 22") being provided at the side of the bolt element (10') facing the rivet portion (20).

20. The functional element in accordance with claim 18, wherein a head section having the ring-like contact surface is provided; in that the shaft part of the bolt element is arranged at the same side of the head part as the ring-like contact surface and projects away from the latter and in that the tubular rivet portion (20) is provided radially within the ring-like contact surface and radially outside of the shaft part.

21. The functional element in accordance with claim 1, wherein it is a nut element (10").

22. The functional element in accordance with claim 21, wherein a head section having the ring-like contact surface is provided which merges into a tubular hollow shaft part projecting from the head portion at the side of the contact surface, with the shaft part being surrounded by the tubular rivet portion (20), with the free end (59) of the shaft part being further removed from the ring-like contact surface than the free end (59) of the rivet portion (20).

23. The functional element in accordance with claim 22, wherein the free end (59) of the shaft part is designed for piercing of a sheet metal part.

24. A functional element in accordance with claim 23, wherein a thread is provided in the head section and also in the region of the shaft part adjacent the head section.

* * * * *